A. LOHMAN.
OZONIZER.
APPLICATION FILED JAN. 20, 1909.

919,445.  Patented Apr. 27, 1909.

WITNESSES:

INVENTOR
Anthony Lohman
BY Augustus B. Stoughton.
ATTORNEY.

UNITED STATES PATENT OFFICE.

ANTHONY LOHMAN, OF PHILADELPHIA, PENNSYLVANIA, ASSIGNOR TO W. W. GIBBS, OF PHILADELPHIA, PENNSYLVANIA.

OZONIZER.

No. 919,445.   Specification of Letters Patent.   Patented April 27, 1909.

Application filed January 20, 1909. Serial No. 473,364.

*To all whom it may concern:*

Be it known that I, ANTHONY LOHMAN, a citizen of the United States, and a resident of Philadelphia, in the county of Philadelphia and State of Pennsylvania, have invented a certain new and useful Ozonizer, of which the following is a specification.

The principal object of the present invention is to provide an efficient, simple and comparatively inexpensive ozonizer and one in which the dielectrics which are made of micanite can, in case of accident, be readily removed and replaced without materially disturbing the setting or device.

The invention will be claimed at the end hereof, but will first be described in connection with the embodiment of it chosen for illustration in the accompanying drawings, in which—

Figure 1:
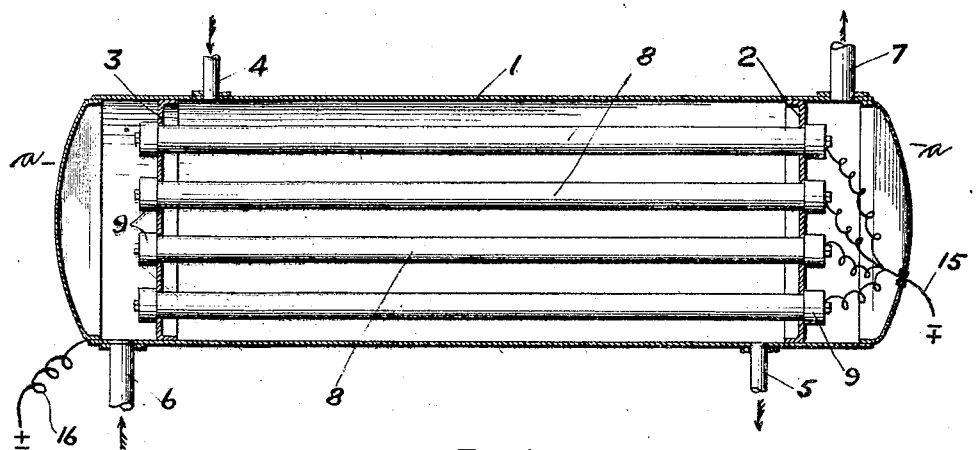
Figure 2:
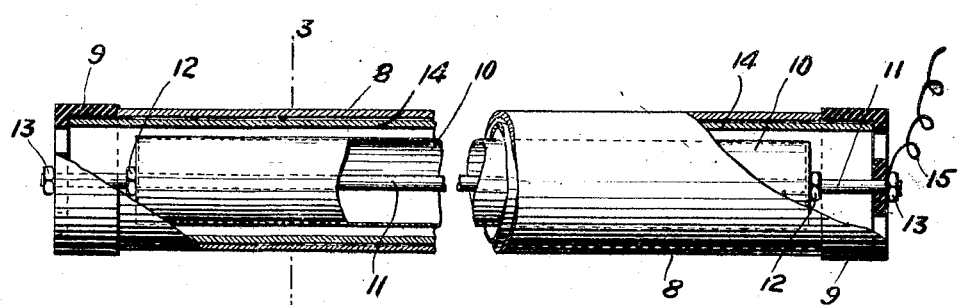
Figure 3:
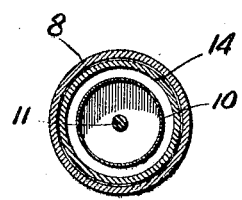
Figure 4:
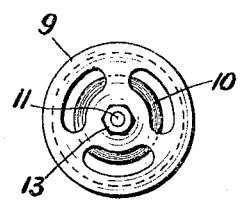

Figure 1, is a sectional view of the complete device. Fig. 2, is an elevational view, partly in section, drawn to an enlarged scale and illustrating one of the ozonizers detached from the setting. Fig. 3, is a section on the line 3—3 of Fig. 2, and Fig. 4, is an end view of the device shown in Fig. 2.

In the drawings 1, is a casing or shell having near its ends tube sheets 2 and 3, which divide it into a central water chamber and end air chambers. The heads *a*, either or both, of the casing 1, are removable as for repairs.

4 and 5, are induction and eduction connections for the water and 6 and 7, are induction and eduction connections for the air chambers.

8, is an open ended tube of electrically conducting material and a number of these tubes are shown as arranged in the water chamber in communication with the air chambers and they are mounted through the tube sheets 3 with their ends exposed therefrom. These tubes are permanently connected with the tube plates and make a tight joint where they pass through the same.

9, are flanged caps having perforated heads.

10, is a hollow cylindrical electrode or discharger; it is attached to and supported by the caps 9, as shown by means of a rod 11, which passes through the caps and through the hollow electrode 10. This rod is shown as held to place by means of nuts 12 and 13. The rod serves to support the electrode 10 in proper relation with respect to the caps, that is usually, axially thereof.

14, is a dielectric consisting of a tube of micanite, to the ends of which the flanges of the caps are fitted. The rims of the caps abut on the ends of the tubes 8 and the caps are arranged outside of the tube plates 2 and 3. The tube 14, encircles the electrode 10 and lies inside of the tube 8, but is not attached or adherent to its inner wall.

15, is a conductor which is in electrical connection with the electrodes 10 or with the rods 11, which amounts to the same thing. The caps 9, are of insulating material as porcelain or the like, so that the electrodes 10 are insulated. 16, is a conductor in electrical connection with the tubes 8 or some part in electrical connection therewith and these connections 15 and 16, are connected to an appropriate source for example, the connection 16 to ground and the connection 15 to one side of the secondary of a transformer, the other side of which is grounded.

In use water keeps the tubes cool and air or other substance to be electrified or ozonized passes through the openings in the caps 9 and between the smooth outer surface of the electrode 10 and the smooth inner surface of the tube 8. There is a discharge between these smooth inner surfaces and through or past the dielectric 14, so that the desired result is obtained. In the event of an accident to the dielectric, one of the heads *a*, is removed and thereupon the dielectric can be readily replaced by removing one of the nuts 13 and withdrawing the adjacent cap and injured dielectric and then replacing the same with a new micanite. During this operation the apparatus or setting is not materially disturbed and the change can be quickly made.

What I claim is:

1. An ozonizer comprising a casing having near its ends tube sheets which divide it into a central water chamber and end air chambers, induction and eduction connections for said chambers, an open ended conducting tube arranged in the water chamber and communicating with said air chambers and fixed through said tube sheets with its ends exposed therefrom, a micanite dielectric detached from said tube and arranged therein, a hollow cylindrical discharger arranged within the dielectric, flanged perforated caps detachably applied to the ends of the dielectric and abutting on the ends of said tube, means for detachably connecting the caps, and discharger and electrical connections to the discharger and tube, substantially as described.

2. An ozonizer comprising a cylindrical imperforate conducting tube open at its ends and having a smooth inner surface, a micanite tubular dielectric independent of said tube and arranged therein with its ends projecting therefrom, insulating flanged caps having perforated heads and detachably applied to the ends of the micanite dielectric with their rims in abutment on the ends of said tube, a hollow smooth surfaced imperforate discharger arranged within the dielectric and provided at its ends with means for detachably engaging said caps, and electrical connections for said tube and discharger, substantially as described.

3. In an ozonizer the combination of an exterior imperforate casing constituting one electrode, an interior imperforate discharger constituting the other electrode, a dielectric consisting of a shell arranged between said parts and independent of and detachable from each, and insulating caps for detachably supporting said parts in proper relative positions, substantially as described.

4. An ozonizer comprising a conducting imperforate tube having a smooth interior surface, a micanite tubular dielectric arranged in and independent of and detachable from said tube with its ends projecting therefrom, flanged caps having perforated ends fitted to the ends of the dielectric and abutting on the ends of said tube, a rod penetrating the central portions of said caps and having thread and nut connections therewith, and a hollow imperforated cylindrical discharger mounted on said rod, substantially as described.

In testimony whereof I have hereunto signed my name.

ANTHONY LOHMAN.

Witnesses:
CLIFFORD K. CASSEL,
FRANK E. FRENCH